(12) United States Patent
Bhogal et al.

(10) Patent No.: US 8,654,944 B2
(45) Date of Patent: Feb. 18, 2014

(54) AUTOMATED CALL TO A CONTACT WITH WHOM ANOTHER FORM OF COMMUNICATION IS EXCHANGED

(75) Inventors: Kulvir S. Bhogal, Pflugerville, TX (US); Lisa Seacat DeLuca, San Francisco, CA (US); Mark William Talbot, Austin, TX (US)

(73) Assignee: International Business Machines Corporation, Armonk, NY (US)

(\*) Notice: Subject to any disclaimer, the term of this patent is extended or adjusted under 35 U.S.C. 154(b) by 214 days.

(21) Appl. No.: 12/892,139

(22) Filed: Sep. 28, 2010

(65) Prior Publication Data
US 2012/0076291 A1    Mar. 29, 2012

(51) Int. Cl.
*H04M 11/00* (2006.01)

(52) U.S. Cl.
USPC ..................................... 379/93.24; 379/90.01

(58) Field of Classification Search
USPC .............. 379/93.01, 93.09, 156, 93.24, 90.01
See application file for complete search history.

(56) References Cited

U.S. PATENT DOCUMENTS

| | | |
|---|---|---|
| 6,526,274 B1 | 2/2003 | Fickes et al. |
| 7,412,392 B1 | 8/2008 | Satapathy |
| 7,593,515 B2 | 9/2009 | Balk et al. |
| 2002/0087634 A1 | 7/2002 | Ogle et al. |
| 2010/0062714 A1 | 3/2010 | Ozaki |
| 2012/0077469 A1 | 3/2012 | Bhogal et al. |

*Primary Examiner* — Creighton Smith
(74) *Attorney, Agent, or Firm* — Cuenot, Forsythe & Kim, LLC

(57) ABSTRACT

A method of automating a telephone call to a contact with whom a text based electronic communication is exchanged. The method can include, via a processor, receiving from a first electronic messaging client a first identifier corresponding to a first text based electronic communication sent to a user or received by the user, and receiving from a second electronic messaging client a second identifier corresponding to a second text based electronic communication sent to the user or received by the user. Via the processor, a list that identifies at least the first identifier and the second identifier can be presented. Responsive to receiving a user selection of the first identifier or the second identifier, via the processor, a telephone call can be automatically initiated to a telephone number that corresponds to the selected identifier.

24 Claims, 9 Drawing Sheets

1100

Receive from a first electronic messaging client a first identifier corresponding to a first text based electronic communication sent to a user or received by the user
1102

Receive from a second electronic messaging client a second identifier corresponding to a second text based electronic communication sent to the user or received by the user
1104

Receive a third identifier corresponding to a telephone call in which the user participated via the telephone
1106

Present a list that identifies the received identifiers
1108

Responsive to receiving a user selection of one of the identifiers, automatically initiate a telephone call to a telephone number that corresponds to the selected identifier
1110

FIG. 11

AUTOMATED CALL TO A CONTACT WITH WHOM ANOTHER FORM OF COMMUNICATION IS EXCHANGED

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments disclosed within this specification relate to integration of electronic messaging systems with other types of communication systems. More particularly, the embodiments relate to automating a telephone call to a contact with whom a text based electronic communication is exchanged.

The use of electronic messaging, for example electronic mail (e-mail) and text messaging, has grown to an extent that electronic messaging is now ubiquitous throughout most of the industrialized world. For example, approximately 80% of the U.S. population uses e-mail at least time-to-time. Nonetheless, telecommunication still is a popular means for communicating. Although most information that is verbally communicated during a telephone conversation may otherwise be communicated via e-mail or text messaging, it is often the case that speaking over the telephone is a more efficient mode for exchanging ideas. In other words, it is often quicker for people to exchange their thoughts verbally rather than in writing.

Notwithstanding, when a telephone call us to be placed, the contact placing the call may not have the telephone number memorized. In such instances, the contact usually is tasked with looking up the telephone number either in a telephone book or in a contact management system. Looking up telephone numbers in this manner is somewhat inconvenient.

BRIEF SUMMARY OF THE INVENTION

The embodiments disclosed within this specification relate to a method of automating a telephone call to a contact with whom a text based electronic communication is exchanged. The method can include, via a processor, receiving from a first electronic messaging client a first identifier corresponding to a first text based electronic communication sent to a user or received by the user, and receiving from a second electronic messaging client a second identifier corresponding to a second text based electronic communication sent to the user or received by the user. Via the processor, a list that identifies at least the first identifier and the second identifier can be presented. Responsive to receiving a user selection of the first identifier or the second identifier, via the processor, a telephone call can be automatically initiated to a telephone number that corresponds to the selected identifier.

Another embodiment disclosed within this specification relates to a method of automating a telephone call to a person with whom at least one text based electronic communication is exchanged. The method can include, via a processor, receiving from a user an input within an electronic messaging client, the user input selecting the text based electronic communication. A list identifying a plurality telephones can be presented to the user. A selection of one of the telephones can be received from the user. A telephone call to a sender or a recipient of the text based electronic communication can be automatically initiated via the selected telephone.

Yet another embodiment of the present invention can include a computer program product including a computer-readable medium having computer-readable program code that, when executed, causes a machine to perform the various steps and/or functions described herein.

BRIEF DESCRIPTION OF THE SEVERAL VIEWS OF THE DRAWINGS

FIG. 11 is a flowchart for a method of automating a telephone call to a contact with whom an electronic message is exchanged in accordance with one embodiment of the present invention.

DETAILED DESCRIPTION OF THE INVENTION

Figure 1:
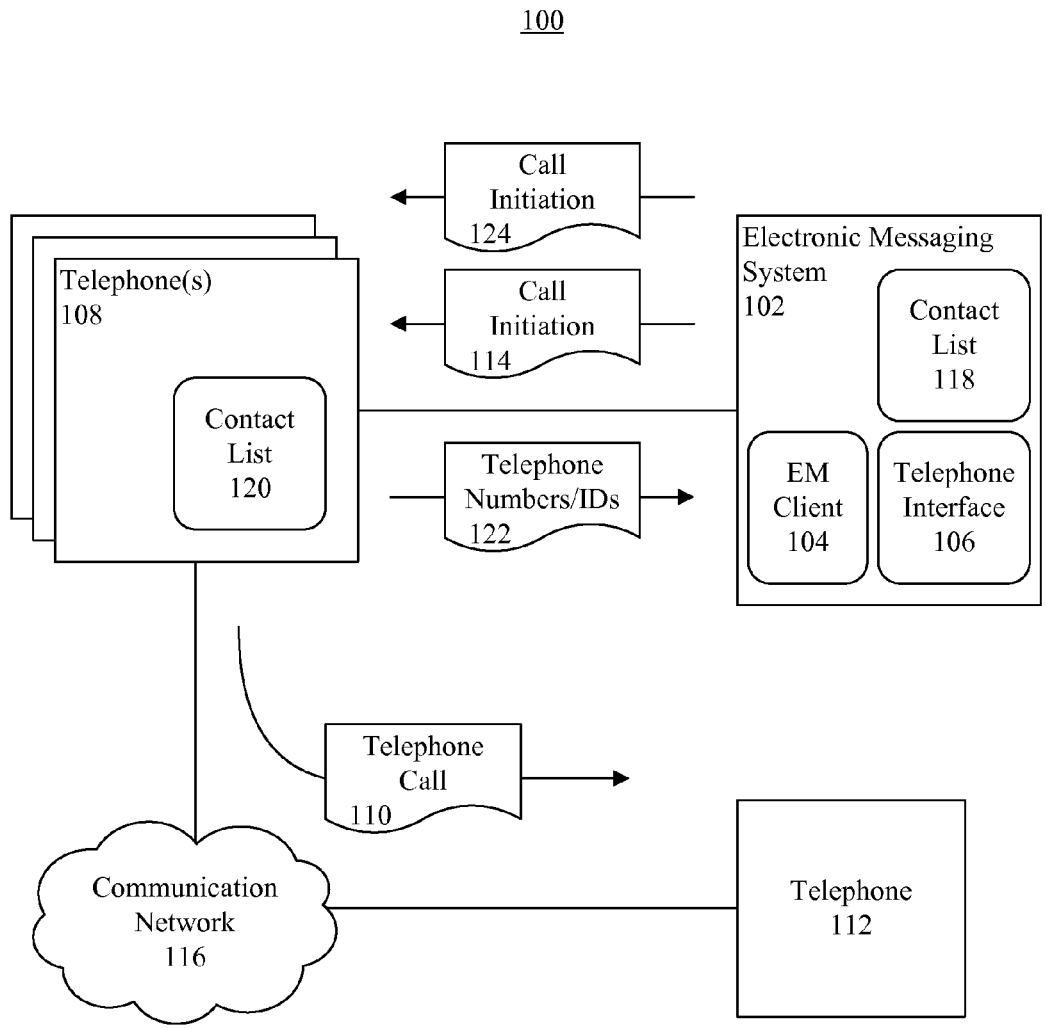
FIG. 1 is a block diagram illustrating a system for automating a telephone call to a contact with whom a text based electronic communication is exchanged in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present invention relate to integration of an electronic messaging system with telephones, telephone systems and/or voice over IP (VoIP) systems. More particularly, the embodiments relate to automating the process of placing a telephone call to a contact with whom communications are exchanged using another form of communication, such as text based electronic communication. For example, the telephone call can be placed in response to an electronic mail (e-mail) or an instant message being sent or received.

In illustration, within an electronic messaging client, an input can be received from a user selecting a text based electronic communication. In response, a telephone call can be automatically placed to the other contact from whom the communication was received or to whom the electronic message was sent. For example, the telephone call can be placed via a telephone at the user's desk, the user's mobile telephone, a VoIP telephone (e.g., a computer or other device having VoIP capability), a telephone having conference call capability, and/or the like. Accordingly, the present invention automates the task of placing the telephone call, thereby relieving the user from the need to look up the telephone number to be dialed and to manually place the telephone call.

FIG. 1 is a block diagram illustrating a system 100 for automating a telephone call to a contact with whom a text based electronic communication (e.g., instant message or e-mail) is exchanged. The system 100 can include an electronic messaging (EM) system 102 associated with a user who has sent or received a text based electronic communication. As used herein, a user is a person, such as a person using the EM client.

The EM system 102 can be a computer, a tablet computer, a personal digital assistant (PDA), or any other device having electronic messaging capabilities. In this regard, the EM system 102 can include an electronic messaging client 104, for example an e-mail client or an instant messaging client.

The EM system 102 also can include a telephone interface 106 that interfaces with one or more telephones 108. As used herein, a telephone is any device that supports voice communications over a suitable communication medium. The telephones 108 can include, for example, a wired telephone, a wireless telephone, a mobile telephone, a cellular telephone, a PDA, a tablet computer having telecommunication capabilities, a VoIP telephone, a telephone having conference call capabilities, or the like. In an arrangement in which the telephone 108 is a computer or other processing system having VoIP capability, a suitable VoIP application can be instantiated on the computer or processing system. The computer/processing system can be a computer/processing system on which the electronic messaging system 102 operates, though this need not be the case.

In one aspect of the invention, the telephone interface 106 can communicate with one or more of the telephones 108 via a wireless communication link, for example in accordance with a short-range wireless communication protocol such as BLUETOOTH® or ZIGBEE®. The telephone interface 106 can communicate with one or more of the telephones 108 via a wired communication link using a suitable communication protocol, for example in accordance with TCP/IP, the universal serial bus (USB) protocol, The IEEE 1394 protocol (FireWire®), etc.

In operation, the EM system 102 can automatically initiate a telephone call 110 from at least one of the telephones 108 to a telephone 112. For example, in response to a user input, the EM system 102 can communicate a call initiation message 114 to a selected telephone 108. The call initiation message 114 can be processed by the telephone 108 to initiate the telephone call 110. The EM system 102 can communicate the call initiation message to the telephone 108 via a wired communication link or a wireless communication link.

In one arrangement, the call initiation message 114 can indicate a telephone number to be dialed by the telephone 108. In another arrangement, the call initiation message 114 can indicate a contact (e.g., a person) to be called. For example, the call initiation message 114 can indicate a user name or user identifier of the contact. The telephone 108 can process the user name or user identifier to select the telephone number associated with the contact to be called, for instance to select a telephone number of the telephone 112.

In response to the call initiation message 114 or a second call initiation message 124, which will be described, the telephone call 110 can be placed via a suitable communication network 116. The communication network 116 can include a public switched telephone network (PSTN), a cellular communications network, the Internet, a wide area network (WAN), a local area network (LAN), and/or any other communication network suitable for supporting telecommunications.

Figure 2:
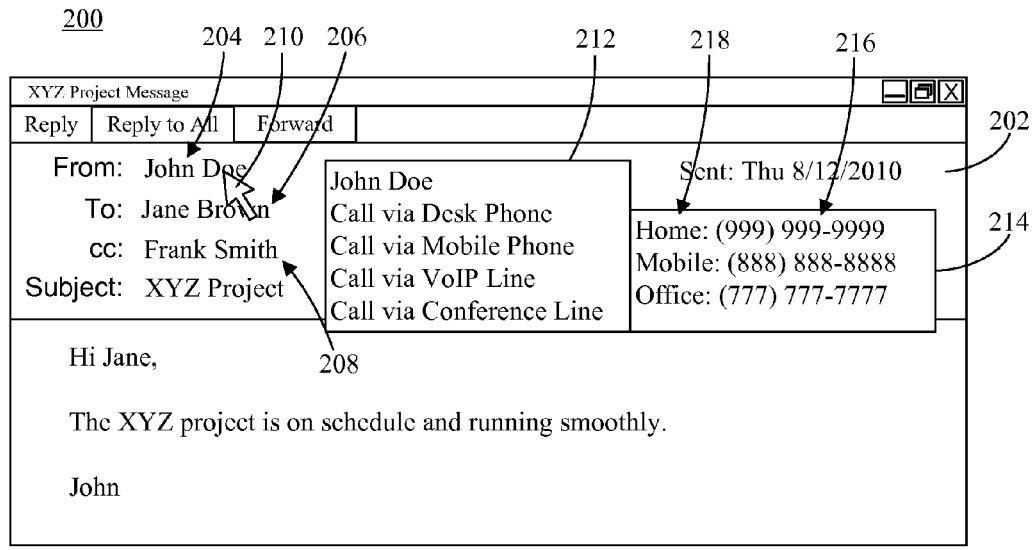
FIG. 2 is a view of an electronic message opened within an electronic messaging client in accordance with an embodiment of the present invention.

FIG. 2 is a view 200 of an electronic message 202 opened within an electronic messaging client in accordance with an embodiment of the present invention. The electronic message 202 can be an e-mail, a text message, or any other type of text based electronic communication. The electronic message 202 can include one or more fields that identify a contact, for example a "from" field 204, a "to" field 206, a "cc" field 208, and so on. The fields 204-208 can indicate contact names, contact e-mail addresses, contact text messaging identifiers or addresses, or any other identifiers associated with contacts.

When a user wishes to place a telephone call to a contact, the user can select the corresponding field 204-208. For instance, if the user desires to place a telephone call to "John Doe," the user can select the field 204 using a cursor 210, by navigating to the field using a keyboard/keypad, or select the field 204 in any other suitable manner. In response to the user selecting a field 204, a call menu 212 can be presented. The call menu 212 can present to the user a list of various calling options for placing the telephone call to the selected contact. For example, the call menu 212 can indicate an option for calling the contact via a desk telephone, via a mobile telephone, via a VoIP line, via a conference telephone line, etc.

Referring both to FIG. 1 and FIG. 2, the call options that are presented in the call menu 212 can be generated in response to a scan performed by the EM client 104 to identify the various call options. In illustration, via the telephone interface 106, the EM client 104 can scan for telephones 108 wirelessly detectable by the EM system (e.g., via a BLUETOOTH® or ZIGBEE® communication link), and/or scan for telephones 108 communicatively linked to the EM system 102, for instance via a private branch exchange (PBX) telephone system. The EM client 104 also can scan for telephones 108 communicatively linked to the EM system 102, embodied as telecommunication applications, and suitable hardware, on the EM system 102, and so on. Based on the telephones 108 that are detected, the call menu 212 can be populated with the available call options. For instance, the detected telephones can be presented in the list of the call menu 212.

The user can select an available call option from the call menu 212 to initiate the telephone call 110 to the selected contact via the telephone 108. For example, if the user selects the option to call the selected contact via a mobile telephone, the EM client 104 can, via the telephone interface 106, establish a wireless communication link with the mobile telephone. In another example, if the user selects the option to call the selected contact via desk telephone, the EM client 104 can, via the telephone interface 106, establish a wired communication link with the desk telephone.

The EM client 104 can communicate the call initiation message 114 to the telephone 108 to initiate the telephone call. As noted, the call initiation message 114 can indicate the telephone number to be called, a user name of the contact, a user identifier of the contact, or the like. In response to the call initiation message, the mobile telephone can place the telephone call 110 to a telephone number associated with the contact. In an arrangement in which the telephone is a computer having VoIP capability, a suitable VoIP application can be automatically launched in response to the call initiation message 114.

In an arrangement in which the call initiation message 114 indicates the telephone number to be called, the EM client 104 can search a contact list (or contact database) 118 to retrieve one or more available telephone numbers 216 and/or target telephones 218 for the selected contact. The contact list 118 can be associated with the EM client 104, or otherwise contained in a data storage to which the EM client 104 is communicatively linked. If more than one telephone number 118 is associated with the contact, the EM client 104 can present a list 214 of the telephone numbers 216 and/or target telephone identifiers 218 from which the user can select the telephone number to dial and/or the target telephone to call.

In an arrangement in which the call initiation message 114 indicates the contact to be called using a contact name or other user identifier associated with the contact, the telephone 108 selected for placing the call to the user can search a contact list (or contact database) 120 to retrieve the telephone number(s) for the selected contact. The contact list 120 can be associated with the telephone, or otherwise contained in a data storage to which the telephone is communicatively linked. In an arrangement in which the telephone 108 is a computer having VoIP capability, the VoIP application can retrieve the telephone number(s) for the selected contact.

If there is a single or default telephone number for the selected contact, the telephone 108 can automatically dial the telephone number in response to the call initiation message 114. If, however, a plurality of telephone numbers are associated with the contact, a message 122 that includes the telephone numbers and/or telephone identifiers can be communicated to the EM client 104 via the telephone interface 106. These telephone numbers 216 and/or telephone identifiers 218 can be presented in the list 214. In response to the user selecting one of the telephone numbers 216 or type of telephone 218 to be called, a second call initiation message 124 indicating the selected telephone number and/or telephone identifier can be communicated to the telephone 108 to indicate to the telephone 108 the selected telephone to which to place the telephone call, and the telephone 108 can initiate the telephone call 110 to the selected telephone.

Figure 3:
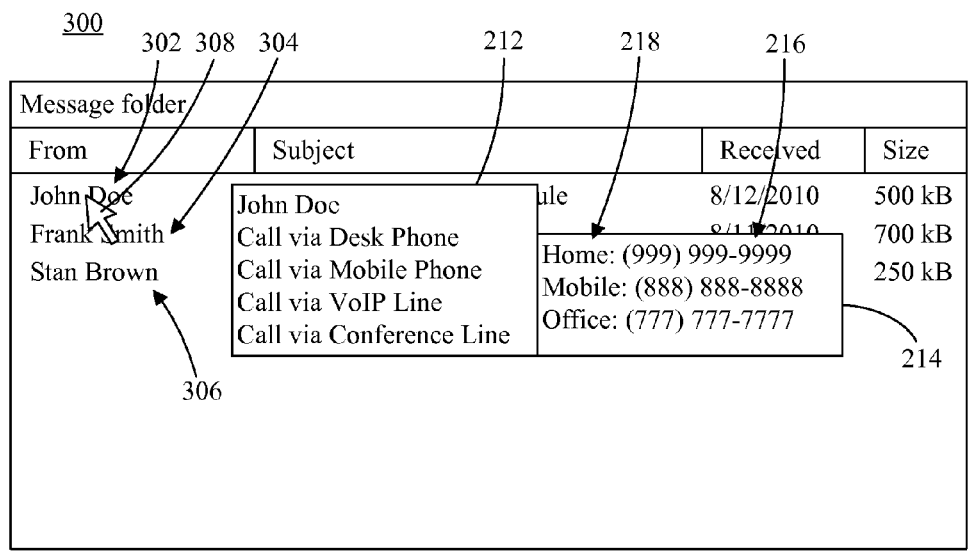
FIG. 3 is a view of a message folder of an electronic messaging client in accordance with an embodiment of the present invention.

FIG. 3 is a view of a message folder 300 of an electronic messaging client in accordance with an embodiment of the present invention. The message folder 300 can be an inbox, an outbox, a sent items folder, a user defined box or folder, or any other folder that indicates electronic messages sent and/or received via the EM client. The message folder can include one or more fields 302, 304, 306 that identify a contact to whom an electronic message is sent or received.

Referring to FIG. 1 and FIG. 3, when a user wishes to place a telephone to a contact, the user can select the corresponding field 302-306. For instance, if the user wishes to call "John Doe," the user can select the field 302 using a cursor 308, by navigating to the field using a keyboard/keypad, or select the field 302 in any other suitable manner. In response to the user selecting a field 302, the call menu 212 can be presented. The call menu 212 can present to the user various calling options for placing a telephone call to the selected contact, as previously described, and the user can select an available call option from the call menu 212 to initiate the telephone call 110 to the selected contact. In response, the call initiation message 114 can be communicated to the selected telephone 108 to initiate the telephone call 110.

As previously described, in an arrangement in which the call initiation message 114 indicates the telephone number to be called, the EM client 104 can search a contact list (or contact database) 118 to retrieve the telephone number for the selected contact. If more than one telephone number is associated with the contact, the EM client 104 can present the list 214 of the telephone numbers from which the user can select the telephone number to dial.

In an arrangement in which the call initiation message 114 indicates the contact to be called using a contact name or other user identifier associated with the contact, the telephone 108 selected for placing the call to the user can search a contact list (or contact database) 120 to retrieve the telephone number(s) for the selected contact. The contact list 120 can be associated with the telephone, or otherwise contained in a data storage to which the telephone is communicatively linked.

As noted, if there is a single or default telephone number for the selected contact, the telephone 108 can automatically dial the telephone number in response to the call initiation message 114. If, however, a plurality of telephone numbers are associated with the contact, a message 122 that includes the telephone numbers and/or telephone identifiers can be communicated to the EM client 104 via the telephone interface 106. These telephone numbers 216 and/or telephone identifiers 218 can be presented in the list 214. In response to the user selecting one of the telephone numbers 216 or type of telephone 218 to be called, a second call initiation message 124 indicating the selected telephone number and/or telephone identifier can be communicated to the telephone 108 to indicate to the telephone 108 the selected telephone to which to place the telephone call.

Figure 4:
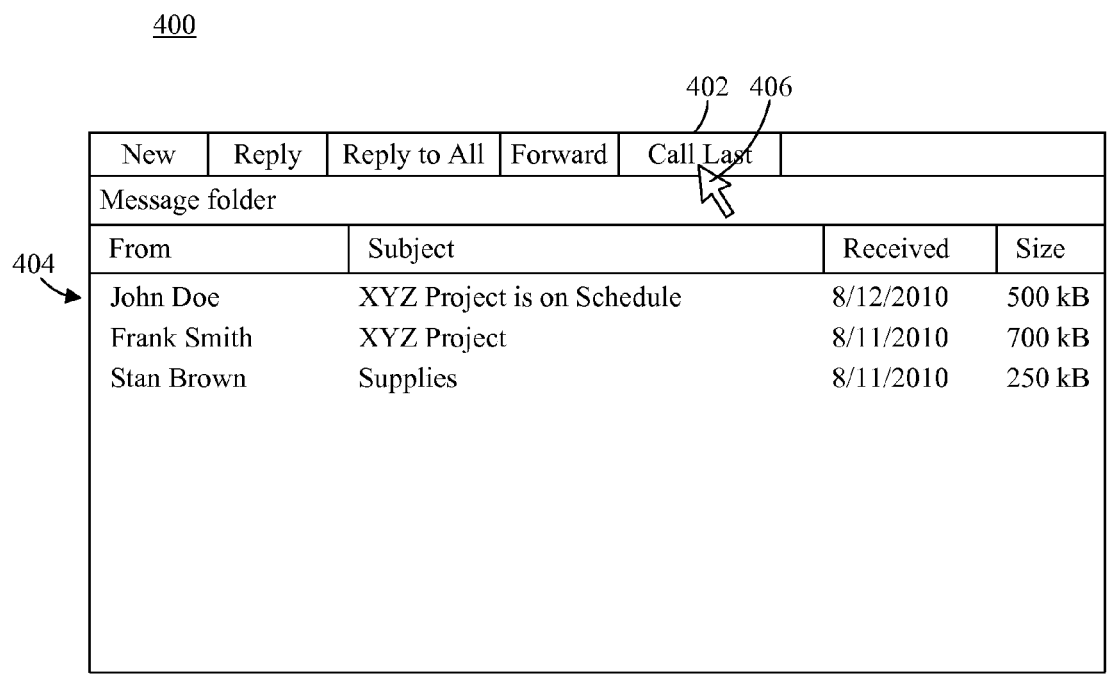
FIG. 4 is another view of a message folder of an electronic messaging client in accordance with an embodiment of the present invention.

FIG. 4 is another view of a message folder 400 of an electronic messaging client in accordance with an embodiment of the present invention. The message folder 400 can be an inbox, an outbox, a sent items folder, a user defined box or folder, or any other folder that indicates electronic messages sent and/or received via the EM client. The message folder can include a user selectable user interface (UI) element 402 that, when selected, initiates a telephone call to a contact associated with a most recent text based electronic message sent or received. The UI element 402 can be a button, icon, or any other suitable user selectable UI element. A user can select the UI element 402 using a cursor 406, using a keyboard or keypad, or select the UI element 402 in any other suitable manner.

Referring to FIG. 1 and FIG. 4, when a user selects the UI element 402, the call initiation message 114 can be communicated to a telephone 108 to initiate a call to a contact associated with a most recently received or sent electronic message 404. In this regard, no other user actions need be necessary to initiate the telephone call other than the selection of the UI element 402. In other words, the call can be initiated with a single user selection. In illustration, the electronic message 404 can be a message received from John Doe. The user can select the UI element 402 to automatically initiate the telephone call 110 to John Doe. In another example, the electronic message 404 can be a message sent to John Doe, and the user can select the UI element 402 to automatically initiate the telephone call 110 to John Doe.

As noted, in one embodiment the call initiation message 114 can indicate the telephone number to be called. In response to the call initiation message 114, the telephone 108 can place the telephone call 110 to the telephone number indicated in the call initiation message 114. In another embodiment, the call initiation message 114 can indicate a user name of the contact to be called, a user identifier of the contact, or the like. In response to the call initiation message 114, the telephone 108 can select the contact's telephone number from the contact list 120 and place the call to the selected telephone number.

The telephone 108 that is selected to place the telephone call 110 can be based on user preferences established in the EM client 104. In one embodiment, the user can indicate multiple telephones 108 that may be used to place the telephone call 110, and rank the telephones 108 in order of priority. Such indication and rankings can be saved as user preferences within the EM client 104.

When the UI element 402 is selected, the EM client 104 can, via the telephone interface 106, scan for available telephones. For example, the EM client 104 can scan and identify, via a wireless communication link, a telephone 108 indicated by the user preferences. In one embodiment, the identification of such telephone can include establishing a communication link with the telephone 108 via a short-range wireless communication protocol. The EM client 104 also can scan for telephones 108 via other wireless communication links and/or via wired communication links. For example, the EM client 104 can communicate with a PBX telephone system to detect one or more telephones 108 indicated by the user preferences, detect a telephone connected to the EM system 102, detect a VoIP application/telephone 108, and so on. From among the detected telephones 108, the telephone 108 having the highest ranking, as indicated by the user preferences, can be automatically selected to place the telephone call 110. For instance, after the telephone 108 has been selected, the call initiation message 114 can be communicated to the selected telephone 108 to initiate the telephone call 110.

Figure 5:
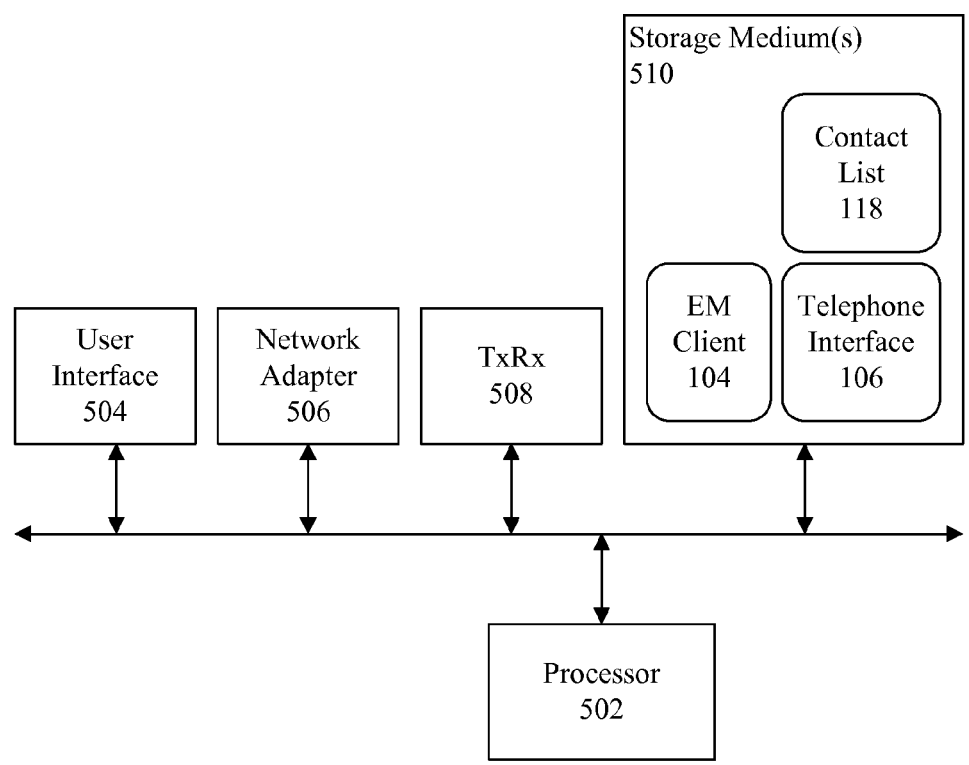
FIG. 5 is a block diagram of an electronic messaging system in accordance with an embodiment of the present invention.

FIG. 5 is a block diagram of the electronic messaging system 102 in accordance with an embodiment of the present invention. The electronic messaging system 102 can include at least one processor 502 coupled to a user interface 504, a network adapter 506, a wireless communication transceiver 508, and at least one storage medium 510, for example through a system bus and/or a communication network.

The user interface 504 can comprise, for example, a display, a mouse, a keyboard, loudspeakers and/or any other devices that present the EM client 104 and other information to a user, and receive information from a user. Modems, cable modems, and Ethernet cards are examples of different types of network adapters 506 that can be used with the electronic messaging system 102, but the present invention is not limited to these specific examples. The transceiver 508 can be configured to communicate with a wireless telephone, for example using a short-range communication protocol such as BLUETOOTH® or ZIGBEE®. Still, the transceiver 508 can be configured to communicate in accordance with any other suitable wireless communication protocols and the invention is not limited in this regard.

The electronic messaging system 102 can store program code and data within the storage medium(s) 510, and retrieve computer program code and data from the storage medium(s) 510. The processor 502 can execute the program code accessed from storage medium(s) 510. In one aspect, for example, the electronic messaging system 102 can be implemented as a computer that is suitable for storing and/or executing program code. It should be appreciated, however, that electronic messaging system 102 can be implemented in the form of any system comprising one or more processors and memory that is capable of performing the functions described within this specification. Moreover, the electronic messaging system 102 can be distributed among one or more devices. For example, the electronic messaging system 102 can be distributed among one or more computing systems located in different locations.

The electronic messaging system 102 also can include one or more cache memories (not shown) that provide temporary storage of at least some program code in order to reduce the number of times program code must be retrieved from bulk storage device during execution.

As pictured in FIG. 5, the storage medium(s) 510 can store the EM client 104, which may be implemented in the form of executable program code. The EM client 104 can be executed by the processor 502 and/or executed by another processor communicatively linked to the electronic messaging system 102. The storage medium(s) 510 further can store the telephone interface 106. The telephone interface 106 can communicate with the telephones via the network adapter 506 and/or transceiver 508 using an appropriate communication protocol.

Figure 6:
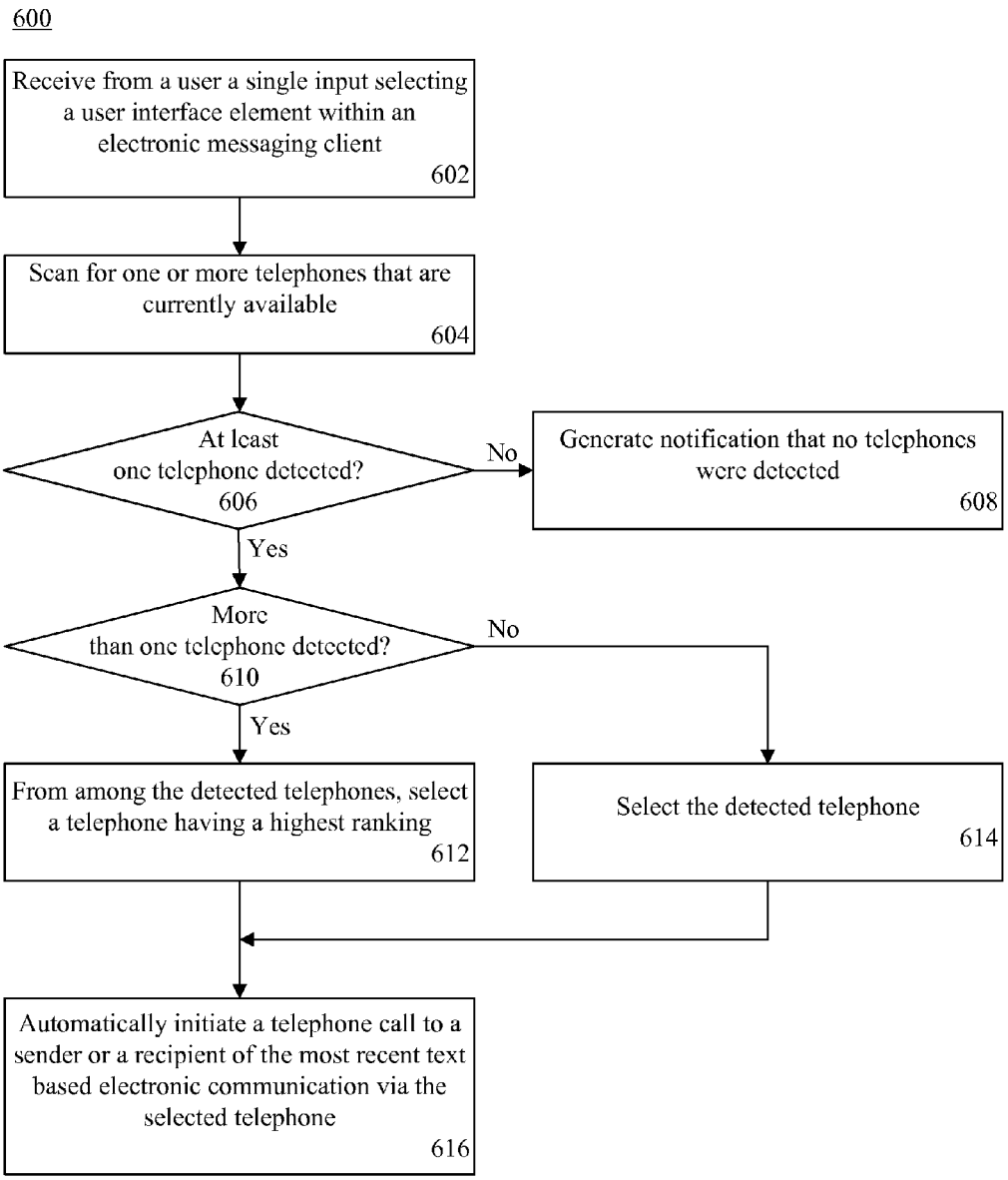
FIG. 6 is a flowchart for a method of automating a telephone call to a contact with whom an electronic message is exchanged in accordance with one embodiment of the present invention.

FIG. 6 is a flowchart for a method 600 of automating a telephone call to a contact with whom an electronic message is exchanged in accordance with one embodiment of the present invention. At step 602, a single user input can be received selecting a user interface (UI) element within an electronic messaging client. As noted, the electronic messaging client can be an e-mail client, an instant messaging client, or a client for any other form of text based electronic messaging. The user input can be a single user action, for example a single selection (e.g., a mouse click) on a button, icon, or any other type of UI element.

At step 604, a scan can be performed to detect one or more telephones that are currently available. As noted, the scan can be performed via a wireless communication link and/or a wired communication link. In illustration, the scan can detect telephones via a short-range wireless communication link. The scan also can detect telephones via a PBX telephone system, telephones directly connected to the EM system, and/or a VoIP application/hardware on, or connected to, the EM system.

Referring to decision box 606, if at least one telephone is not detected, at step 608 a notification can be generated to indicate that no telephones were detected. For example, a popup window can be presented to the user in the EM client. If at least one telephone is detected, at decision box 610 a determination can be made as to whether more than one telephone was detected. If so, at step 612 a telephone having a highest ranking can be selected from among the detected telephones. As noted, the telephone rankings can be based on user preferences, although the invention is not limited in this regard. If only one telephone is detected, at step 614 that telephone can be selected.

At step 616, a telephone call can be automatically initiated, via the selected telephone, to a sender or a recipient of the most recent text based electronic communication. In one embodiment, the selection of the most recent electronic communication can be limited to the most recent electronic communication within a particular message folder, such as a message folder that is open for view. Thus, even if there are communications that are more recent, but not indicated within the currently open message folder, such communications can be ignored. In another embodiment, the selection of the most recent electronic communication is not limited exclusively to an open folder. Thus, the most recent electronic communication may be contained in another message folder. User preferences can be established to determine which of these embodiments is to be implemented at a particular time.

Figure 7:
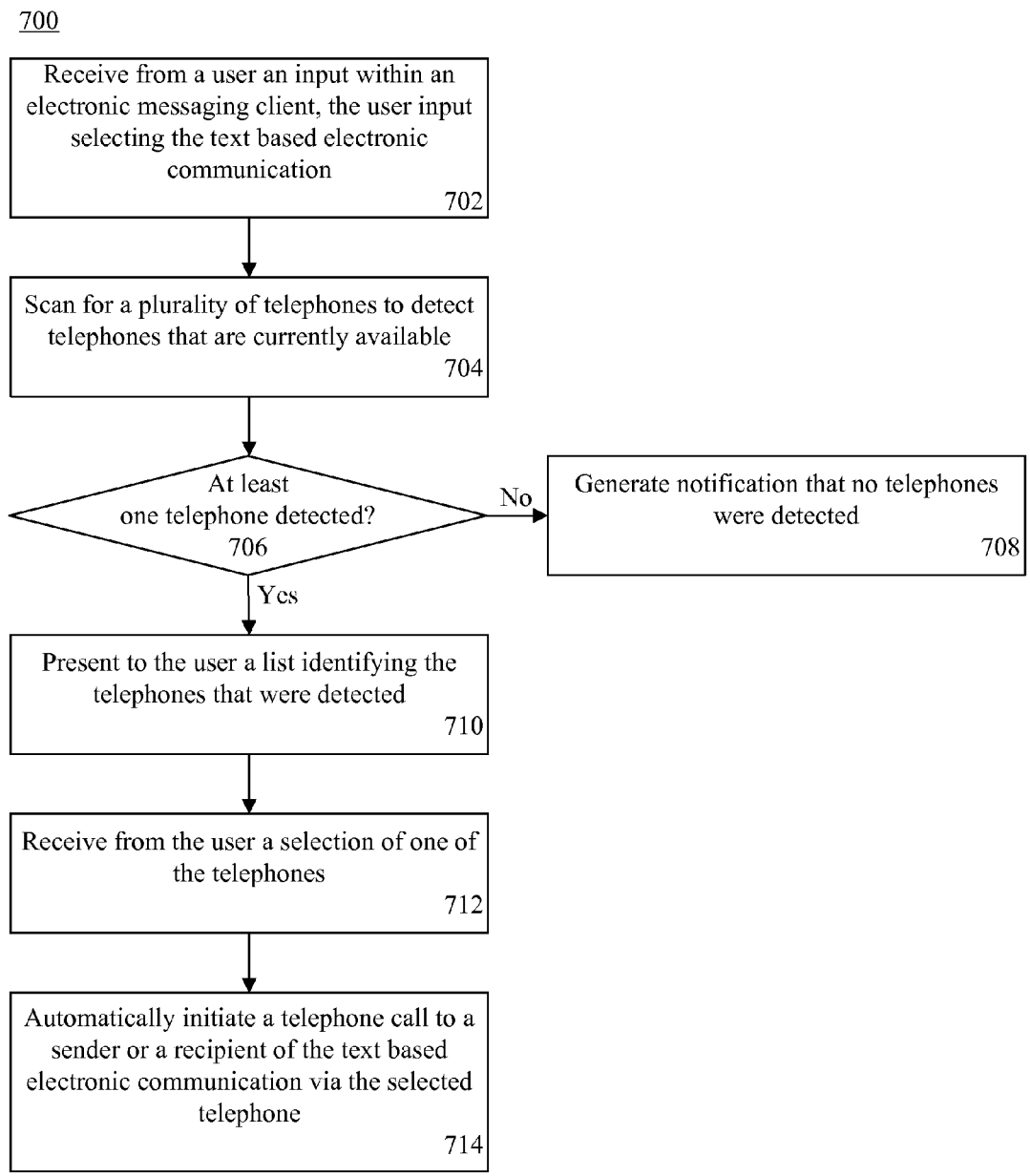
FIG. 7 is another flowchart for a method of automating a telephone call to a contact with whom an electronic message is exchanged in accordance with one embodiment of the present invention.

FIG. 7 is another flowchart for a method 700 of automating a telephone call to a contact with whom an electronic message is exchanged in accordance with one embodiment of the present invention. At step 702, an input within an electronic messaging client can be received from a user. The user input can select a text based electronic communication. At step 704, in response to the user input, a scan for a plurality of telephones can be performed to detect telephones that are currently available. As noted, the scan can detect telephones via a short-range wireless communication link. The scan also can detect telephones via a PBX telephone system, telephones directly connected to the EM system, and/or a VoIP application/hardware on, or connected to, the EM system.

Referring to decision box 706, if at least one telephone is not detected, at step 708 a notification can be generated to indicate that no telephones were detected. For example, a popup window can be presented to the user in the EM client. If at least one telephone is detected, at step 710 a list identifying the telephones that were detected can be presented to the user. For example, the list can be presented in a menu of selectable telephone identifiers. At step 712, a user selection of one of the telephones can be received from the user. At step 714, a telephone call to a sender or a recipient of the text based electronic communication can be automatically initiated via the selected telephone. As noted, if more than one telephone number or target telephone is associated with the contact to be called, a list can be presented to the user to prompt the user to select which telephone/telephone number that is to be called.

Figure 8:
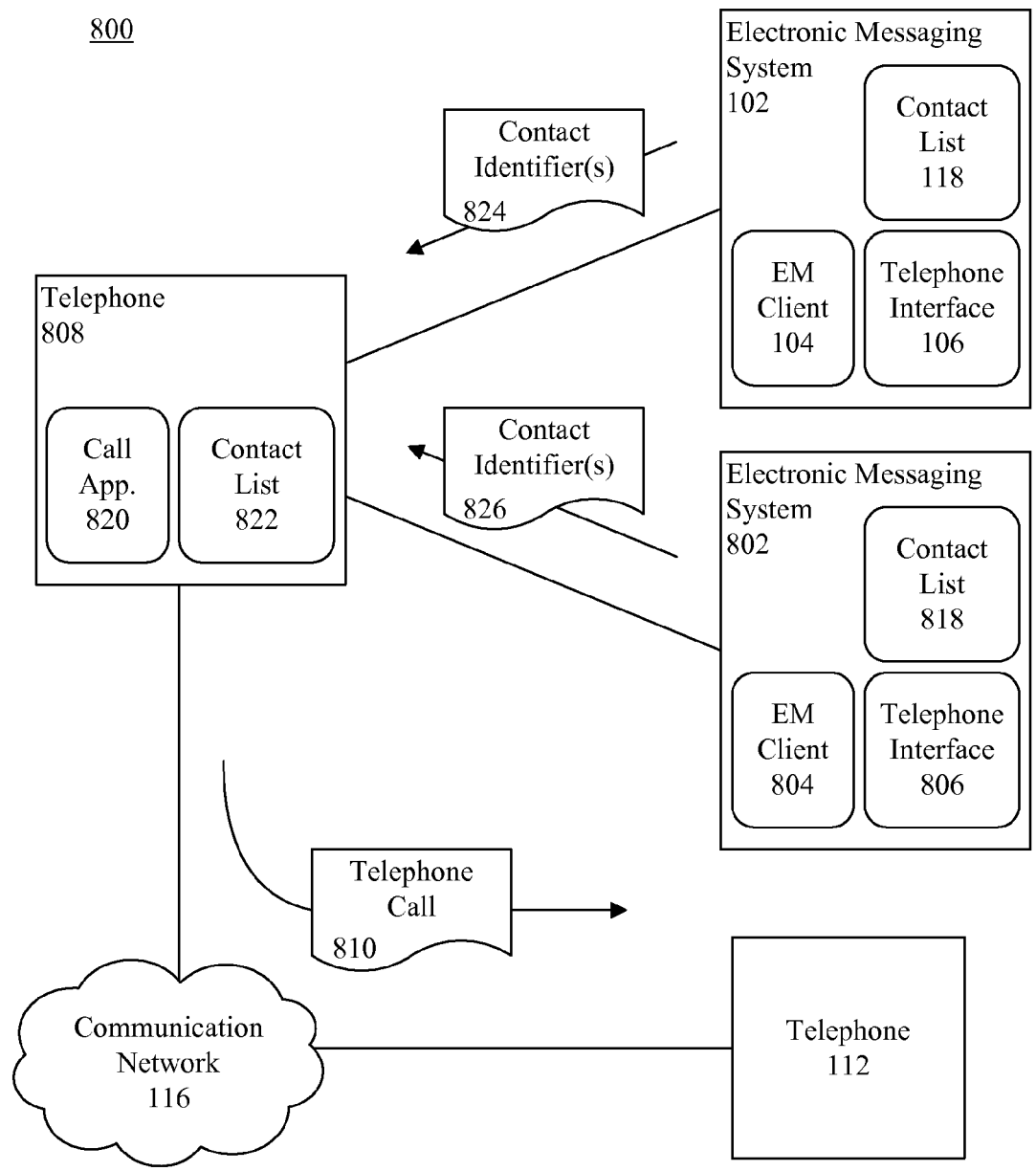
FIG. 8 is a block diagram illustrating a system for automating a telephone call to a contact with whom a text based electronic communication is exchanged in accordance with another embodiment of the present invention.

FIG. 8 is a block diagram illustrating a system 800 for automating a telephone call to a contact with whom a text based electronic communication is exchanged in accordance with another embodiment of the present invention. The system 800 can include an EM system 102, a telephone 112 and a communication network 116, such as those previously described with respect to FIG. 1. As noted, the EM system 102 can include an EM client 104, telephone interface 106 and contact list 118, each of which have been previously described.

The system 800 also can include a telephone 808. The telephone 808 can be, for example, a wired telephone, a wireless telephone, a mobile telephone, a cellular telephone, a PDA, a tablet computer having telecommunication capabilities, a VoIP telephone, a telephone having conference call capabilities, or the like. In an arrangement in which the telephone 808 is a computer or other processing system having VoIP capability, a suitable VoIP application can be instantiated on the computer or processing system.

In addition, the system 800 further can include a second EM client 804. In one embodiment, the EM client 804 can be instantiated on a second EM system 802. In such an arrangement, the second EM system 802 further can include a telephone interface 806 and a contact list 818. The EM client 804, telephone interface and contact list 818 can function as previously described for the EM client 104, telephone interface 106 and contact list 118.

In another embodiment, the EM client 804 can be instantiated on the EM system 102, in which case the EM system 102 can include a plurality of EM clients 104, 804. In yet another embodiment, one or both of the EM clients 104, 804 can be instantiated on the telephone 808. If both EM clients 104, 804 are instantiated on the telephone 808, the EM systems 102, 802 are not required.

In operation, the telephone 808 can be synchronized with the EM clients 104, 804. The telephone 808 can be synchronized with the EM clients 104, 804 simultaneously, though this need not be the case. For example, the telephone can be synchronized with the EM client 104 and at a later time be synchronized with the EM client 804. In illustration, the telephone 808 can be synchronized with the EM client 104 when the telephone 808 is proximate to the EM system 102, for instance while the user uses the EM system 102, and the telephone 808 can be synchronized with the EM client 804 when the telephone 808 is proximate to the EM system 802, for example while the user uses the EM system 802. Such synchronizations can be performed automatically or in response to a user request.

During the synchronization process, the EM client 104 can communicate to the telephone 808, via the telephone interface 106, one or more contact identifiers 824 corresponding to electronic communications sent from, or received by, the EM client 104, including text based electronic communications and other electronic communications such as telephone calls and video conferences. Similarly, the EM client 804 can communicate to the telephone 808, via the telephone interface 806, one or more contact identifiers 826 corresponding to electronic communications sent from, or received by, the EM client 804, including text based electronic communications and other electronic communications such as telephone calls and video conferences. The contact identifiers 824, 826 can be received by a call application 820 instantiated on the telephone 808.

Each contact identifier 824, 826 can indicate a user name and time/date stamp associated with a particular electronic communication. The user name can be a name, or other identifier, associated with a contact (e.g., a person or other entity) to which an electronic communication is sent or from which an electronic communication is received. Optionally, each contact identifier 824, 826 also can indicate a form of a respective electronic communication, one or more telephone numbers associated with the contact, etc. In this embodiment, the telephone numbers can be retrieved from the contact lists 118, 818. If the contact identifiers 824, 826 do not include the telephone number(s) associated with the contact, the call application can retrieve the telephone number(s) from a contact list 822 associated with the telephone 808. The contact list 822 can be stored on the telephone 808, or another device to which the telephone 808 is communicatively linked.

The contact identifiers 824, 826 can be processed by the call application 820 to present a call menu containing a list of the contact identifiers 824, 826 from which the user can select. In one embodiment, the list also can include contact identifiers corresponding to calls place by, or received by, the telephone 808. The contact identifiers can be presented in any suitable order, for example based on the date/time stamps, user identifiers, telephone numbers, or the like. In response to the user selecting a particular contact identifier 824, 826 presented in the list, a telephone call 810 can be automatically placed to that contact from the telephone 808, for example to the telephone 112.

Figure 9:
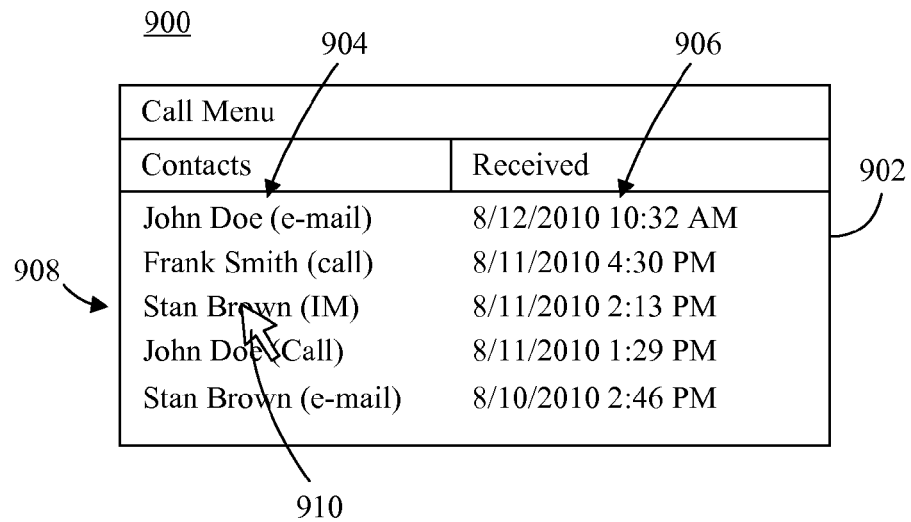
FIG. 9 is a view of call menu opened within a telephone in accordance with an embodiment of the present invention.

FIG. 9 is a view of call menu 900 opened within a telephone in accordance with an embodiment of the present invention. The call menu 900 can be presented on the telephone 808 of FIG. 8. In one embodiment, the call menu 900 can be presented in response to a user selection of a suitable button or key on the telephone 808, in response to a user selection of an icon or button presented in a user interface of the telephone 808, or in response to any other suitable user actions. In another embodiment, the call menu 900 can be presented in response to an electronic message being sent or received via an electronic messaging client. User settings on the telephone also can be configured to determine when the call menu 900 is to be presented. Nonetheless, the invention is not limited in this regard and the call menu 900 can be presented in response to any other triggers.

As noted, the call menu 900 can present a list 902 of contact identifiers 904, and the contact identifiers can indicate user identifiers. The contact identifiers 904 also can indicate a form of communication used to previously communicate with the contacts, for example whether the previous communications were e-mails, telephone calls, instant messages, or the like. The call menu 902 also can indicate time/date stamps 906 that indicate when the previous communications took place. As noted, the list 902 can be sorted based on when the previous communications took place (e.g., based on the time/date stamps 906), sorted based on the user identifiers 904, or sorted in any other suitable manner.

When the user wishes to place a telephone call to one of the contacts, the user can select a contact, for example the contact 908. The user can select the contact using a cursor 910, using a keypad or keyboard, or the user can select the contact 908 in any other suitable manner. In response to the user selecting the contact 908, a call to the contact 908 can be automatically placed to a telephone number associated with the contact. If multiple telephones are associated with the contact, a default telephone number can be called, or the user can be prompted in a suitable manner to select the telephone number to call. For example, a second menu (not shown) can be provided from which the user can select the telephone number to call, or the list 902 can be expanded to indicate the telephone numbers associated with the contact 908.

Figure 10:
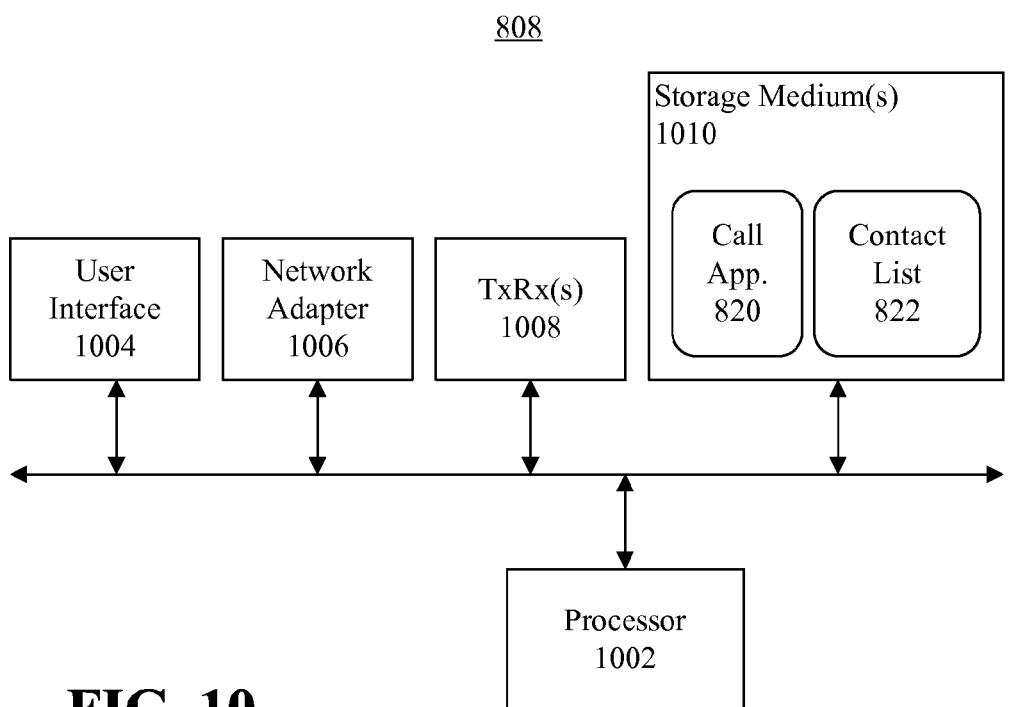
FIG. 10 is a block diagram of a telephone in accordance with an embodiment of the present invention.

FIG. 10 is a block diagram of a telephone 808 in accordance with an embodiment of the present invention. The telephone 808 can include at least one processor 1002 coupled to a user interface 1004, a network adapter 1006, a wireless communication transceiver 1008, and at least one storage medium 1010, for example through a system bus and/or a communication network.

The user interface 1004 can comprise, for example, a display, a keyboard, a keypad, an input audio transducer, and output audio transducer, and/or any other devices that present telecommunication information, and other desired information to a user, and receive information from a user. Modems, cable modems, and Ethernet cards are examples of different types of network adapters 1006 that can be used with the telephone 808, but the present invention is not limited to these specific examples. In another arrangement, the network adapter 1006 can comprise components that enable the telephone 808 to communicate via a PBX telephone system, a PSTN, or the like. In yet another arrangement, the network adapter 1006 can be a wireless network adapter that enables the telephone 808 to communicate via a cellular communications network, a wireless LAN, a wireless WAN, or any other wireless communications network suitable for telecommunications.

The transceiver 1008 can be configured to communicate with a wireless telephone, for example using a short-range communication protocol such as BLUETOOTH® or ZIG-BEE®. Still, the transceiver 1008 can be configured to communicate in accordance with any other suitable wireless communication protocols and the invention is not limited in this regard.

The telephone 808 can store program code and data within the storage medium(s) 1010, and retrieve computer program code and data from the storage medium(s) 1010. The processor 1002 can execute the program code accessed from storage medium(s) 1010. The telephone 808 also can include one or more cache memories (not shown) that provide temporary storage of at least some program code in order to reduce the number of times program code must be retrieved from bulk storage device during execution.

As pictured in FIG. 10, the storage medium(s) 1010 can store the call application 820, which may be implemented in the form of executable program code. The the call application 820 can be executed by the processor 1002. The storage medium(s) 1010 further can store the contact list 822 and/or any other suitable data or applications.

FIG. 11 is a flowchart for a method 1100 of automating a telephone call to a contact with whom an electronic message is exchanged in accordance with one embodiment of the present invention. At step 1102, from a first electronic messaging client, a first identifier can be received. The first identifier can correspond to a first text based electronic communication sent to a user or received by the user. At step 1104, from a second electronic messaging client, a second identifier can be received. The second identifier can correspond to a second text based electronic communication sent to the user or received by the user. Optionally, at step 1106, a third identifier can be received. The third identifier can correspond to a telephone call in which the user participated via the telephone and/or via one or more of the EM systems.

At step 1108, the received identifiers, or other identifiers that correspond to the received identifiers, can be presented in a list. For instance, the identifiers can be presented in a call menu. The list can prompt the user to select one of the identifiers in order to place a call to a corresponding contact. At step 1110, responsive to receiving a user selection of one of the identifiers, a telephone call to a telephone number that corresponds to the selected identifier can be automatically initiated.

Like numbers have been used to refer to the same items throughout this specification, where appropriate. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of automating a telephone call, comprising:
receiving, via a processor and from a first electronic messaging client, a first identifier corresponding to a first text based electronic communication sent to a user;
receiving, via the processor and from a second electronic messaging client, a second identifier corresponding to a second text based electronic communication sent to the user;
presenting, via the processor, a list including the first identifier and the second identifier;
identifying a plurality of telephones accessible by the user; and
initiating, responsive to receiving a user selection of an identifier and a user selection of one of the plurality of telephones, a telephone call to a telephone number that corresponds to the selected identifier.

2. The method of claim 1, further comprising:
receiving a third identifier corresponding to a telephone call in which the user participated via the telephone, wherein
the list further identifies the third identifier.

3. The method of claim 1, wherein
the first identifier is received from a first system communicatively linked to the telephone.

4. The method of claim 3, wherein
the second identifier is received from a second system communicatively linked to the telephone.

5. The method of claim 3, wherein
the first identifier is received via a wireless communication link.

6. The method of claim 3, wherein
the first identifier is received via a wired communication link.

7. The method of claim 1, wherein
the list is sorted according to when the text based electronic communications were sent or received.

8. A method of automating a telephone call to a contact associated with a text based electronic communication comprising:

receiving, from a user and within an electronic messaging client, a selection of the text based electronic communication;
presenting, to the user, a list of a plurality telephones associated with the user;
receiving from the user a selection of one of the telephones; and
automatically initiating, via the selected telephone, a telephone call to the contract associated with the selected text based electronic communication.

9. The method of claim 8, further comprising:
establishing a wireless communication link to the selected telephone, wherein
the telephone call is initiated via the wireless communication link.

10. The method of claim 8, further comprising:
communicating a telephone number to the selected telephone, wherein
the telephone number is associated with the contact.

11. The method of claim 8, further comprising:
communicating a contact identifier corresponding to the selected telephone, wherein
the contact identifier corresponds to a telephone number associated with the contact.

12. The method of claim 8, further comprising:
scanning for a plurality of telephones to detect telephones that are currently available; wherein
the list presented to the user includes the detected telephones.

13. A computer program product comprising:
a computer-readable storage medium having stored thereon computer-readable program code that automates a telephone call to a contact,
the computer-readable program code, which when executed by a system including a processor and a memory, causes the system to perform:
receiving, from a first electronic messaging client, a first identifier corresponding to a first text based electronic communication sent to a user;
receiving, from a second electronic messaging client, a second identifier corresponding to a second text based electronic communication sent to the user;
presenting a list including the first identifier and the second identifier;
identifying a plurality of telephones accessible by the user; and
initiating, responsive to receiving a user selection of an identifier and a user selection of one of the plurality of telephones, a telephone call to a telephone number that corresponds to the selected identifier.

14. The computer program product of claim 13, wherein the computer-readable program code further causes the system to perform:
receiving a third identifier corresponding to a telephone call in which the user participated via the telephone, wherein
the list further identifies the third identifier.

15. The computer program product of claim 13, wherein the first identifier is received from a first system communicatively linked to the telephone.

16. The computer program product of claim 15, wherein the second identifier is received from a second system communicatively linked to the telephone.

17. The computer program product of claim 15, wherein the-first identifier is received via a wireless communication link.

18. The computer program product of claim 15, wherein the first identifier is received via a wired communication link.

19. The computer program product of claim 13, wherein the list is sorted according to when the text based electronic communications were sent or received.

20. A computer program product comprising:
a computer-readable storage medium having stored thereon computer-readable program code that automates a telephone call to a contact associated with a text based electronic communication,
the computer-readable program code, which when executed by a system including a processor and a memory, causes the system to perform:
receiving, from a user and within an electronic messaging client, a selection of the text based electronic communication;
presenting, to the user, a list of a plurality telephones associated with the user;
receiving from the user a selection of one of the telephones; and
automatically initiating, via the selected telephone, a telephone call to the contract associated with the selected text based electronic communication.

21. The computer program product of claim 20, wherein the computer-readable program code further causes the system to perform:
establishing a wireless communication link to the selected telephone, wherein
the telephone call is initiated via the wireless communication link.

22. The computer program product of claim 20, wherein the computer-readable program code further causes the system to perform:
communicating a telephone number to the selected telephone, wherein
the telephone number is associated with the contact.

23. The computer program product of claim 20, wherein the computer-readable program code further causes the system to perform:
communicating a contact identifier corresponding to the selected telephone, wherein
the contact identifier corresponds to a telephone number associated with the contact.

24. The computer program product of claim 20, wherein the computer-readable program code further causes the system to perform:
scanning for a plurality of telephones to detect telephones that are currently available; wherein
the list presented to the user includes the detected telephones.

* * * * *